US011624874B2

(12) United States Patent
Mollard et al.

(10) Patent No.: US 11,624,874 B2
(45) Date of Patent: Apr. 11, 2023

(54) OPTICAL SCANNER

(71) Applicant: COMMISSARIAT A L'ENERGIE ATOMIQUE ET AUX ENERGIES ALTERNATIVES, Paris (FR)

(72) Inventors: Laurent Mollard, Grenoble (FR); Christel Dieppedale, Grenoble (FR); Stéphane Fanget, Grenoble (FR); Daivid Fowler, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 10 days.

(21) Appl. No.: 17/304,570

(22) Filed: Jun. 23, 2021

(65) Prior Publication Data
US 2022/0003933 A1    Jan. 6, 2022

(30) Foreign Application Priority Data
Jul. 1, 2020    (FR) ..................... 20 06925

(51) Int. Cl.
*G02B 26/10*    (2006.01)
*G02B 6/293*    (2006.01)

(52) U.S. Cl.
CPC ....... *G02B 6/29301* (2013.01); *G02B 26/101* (2013.01); *G02B 26/103* (2013.01); *G02B 26/106* (2013.01)

(58) Field of Classification Search
CPC ... G02B 26/101; G02B 26/103; G02B 26/106
See application file for complete search history.

(56) References Cited

U.S. PATENT DOCUMENTS 10,802,269 B2 * 10/2020 Sato .................. G02B 6/30

FOREIGN PATENT DOCUMENTS

FR    2 923 092 A1    5/2009
WO    WO 2018/222727 A1    12/2018

OTHER PUBLICATIONS

U.S. Appl. No. 16/445,290, filed Jun. 19, 2019, 2020/0013852, A1, Le Rhun, G, et al.
U.S. Appl. No. 16/475,901, filed Jul. 3, 2019, 2019/0344278, A1, Agache, V, et al.

(Continued)

*Primary Examiner* — Omar R Rojas
(74) *Attorney, Agent, or Firm* — Oblon, McClelland, Maier & Neustadt, L.L.P.

(57) ABSTRACT

A scanner is provided with a plurality of elementary scanners each able to scan a different surface by means of a light beam. Each elementary scanner comprises a beam, for example a vibrating beam, on or in which a phase-controlled array is formed, intended to extract, at a face of the beam, a light beam able to be emitted by a light source. At least one beam of one of the elementary scanners, referred to as the first scanner, has, at rest, a deflection different from that of the beams of the other elementary scanners. This arrangement enables the first scanner to scan a surface, referred to the first surface, different from that scanned by the other elementary scanners. The optical scanner according to the present invention makes it possible to cover a relatively large surface while keeping appreciable compactness.

11 Claims, 8 Drawing Sheets

(56) References Cited

OTHER PUBLICATIONS

U.S. Appl. No. 16/591,970, filed Oct. 3, 2019, 2020/0109992, A1 Le Rhun, G, et al.
U.S. Appl. No. 16/717,866, filed Dec. 17, 2019, 2020/0203594, A1 Hilt, T, et al.
U.S. Appl. No. 16/848,896, filed Apr. 15, 2020, 2020/0333547, A1 Mollard, L, et al.
U.S. Appl. No. 16/921,117, filed Jul. 6, 2020, 2021/0011280, A1 Fanget, S, et al.
U.S. Appl. No. 17/109,238, filed Dec. 2, 2020, 2021/0173280, A1 Fowler, D, et al.
U.S. Appl. No. 17/254,077, filed Dec. 18, 2020, Le Rhun, G, et al.
French Preliminary Search Report dated Feb. 17, 2021 in French Application 20 06925 filed on Jul. 1, 2020, 2 pages (with English Translation of Categories of Cited Documents)
Holmstrom et al., "MEMS Laser Scanners: A Review", Journal of Microelectromechanical Systems, vol. 23, No. 2, Apr. 2014, pp. 259-275.
Defay, "Integration of Ferroelectric and Piezoelectric Thin Films", Section 13.5.3, Mar. 14, 2011, 56 pages.
Hsueh et al., "Thermal stress analyses of multilayered films on substrates and cantilever beams for micro sensors and actuators", Journal of Micromechanics and Microengineering, 16, 2006, 8 pages.
Sun et al., "Large-scale nanophotonic phased array", Nature, 11727, vol. 493, Jan. 10, 2013, pp. 195-199

* cited by examiner

OPTICAL SCANNER

TECHNICAL FIELD

The present invention relates to the field of optoelectromechanical microsystems ("MOEMS"). In particular, the present invention relates to an optical scanner provided with a plurality of elementary scanners arranged to scan the space surrounding the optical scanner by means of a plurality of light beams.

In this regard, each elementary scanner according to the present invention combines a beam provided with a movable part on which bending can be imposed, and a phase-control array. In particular, at least one beam among the set of beams of the elementary scanners has a deflection different from that of the other beams so as to extend the surface able to be scanned by the set of light beams extracted from the scanner.

PRIOR ART 2D scanners or microscanners are devices for scanning a scene with a light beam in one or even two dimensions. These scanners may in particular be used in devices of the LIDAR (Light Detection And Ranging systems) type for purposes of detection or imaging.

In practice, the scanning of a surface or of an object by a light beam can be achieved by means of one or more movable micromirrors.

Figure 1:
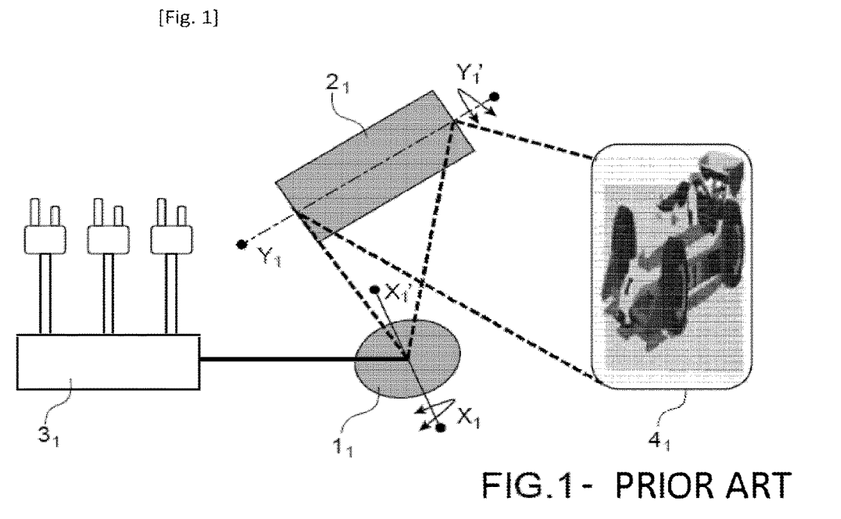
FIG. 1 illustrates a first architecture of a known light-scanning device of the prior art, the device comprises in particular two micromirrors mounted so as to each pivot about a different pivot axis and which are not parallel to each other.

In this regard, FIG. 1 (extracted from document [1] cited at the end of the description) illustrates a first possible architecture of such a device provided with two micromirrors, referred to respectively as first micromirror $1_1$ and second micromirror $2_1$, arranged to pivot about a first pivot axis $X_1X_1'$ and a second pivot axis $Y_1Y_1'$ respectively that are not parallel to each other. In particular, these two micromirrors $1_1$ and $2_1$ are arranged so that a light beam emitted by a light source $3_1$ is reflected by the first micromirror $1_1$ in the direction of the second micromirror $2_1$, which in its turn reflects it in the direction for example of a screen $4_1$. The rotation of each of the micromirrors $1_1$ and $2_1$ about their respective pivot axis thus makes it possible to scan a surface with the light beam for example for imaging or detection purposes.

Such an architecture is however not satisfactory.

Because of the presence of two micromirrors, it is not very compact.

Moreover, this architecture requires a precise alignment of the two micromirrors and is consequently difficult to implement.

Finally, the micromirrors are also liable to undergo damage, in particular by heating caused by the light beam.

Figure 2:
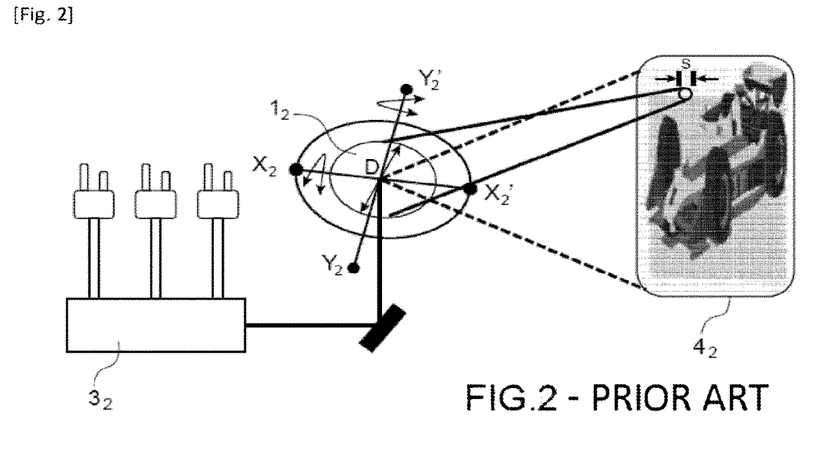
FIG. 2 illustrates a second architecture of a known light-scanning device of the prior art, the device comprises in particular a micromirror mounted so as to pivot about two different and non-parallel pivot axes.

In order to partly overcome these problems, a second architecture, illustrated in FIG. 2 (extracted from document [1] cited at the end of the description), can be envisaged. This uses a single micromirror $1_2$ mounted so as to pivot about two non-parallel pivot axes $X_2X_2'$ and $Y_2Y_2'$. Oscillating this micromirror $1_2$ about each of the two pivot axes $X_2X_2'$ and $Y_2Y_2'$ thus makes it possible to scan the surface of a screen $4_1$, by means of a light beam coming from a light source $3_2$ and reflected by said micromirror $1_2$.

However, this second architecture is also not satisfactory.

This is because, like the first architecture, the micromirror $1_2$ is also liable to suffer heating caused by the light beam.

Moreover, this second architecture is also sensitive to the alignment of the light source $3_2$ and of the micromirror $1_2$. The alignment between these two elements is in particular sensitive to impacts suffered by the device but also to the temperature and pressure conditions imposed thereon.

Furthermore, the oscillations of the micromirror about each of the two pivot axes $X_2X_2'$ and $Y_2Y_2'$, caused by an actuator, are never decoupled so that mechanical crosstalk is liable to occur.

As an alternative to the architectures presented above, 2D microscanners with a phase-control optical emitter or with a phase-control optical array ("OPA" or "Optical Phased Array") have been able to be proposed.

These can comprise a plurality of optical sources able each to emit light radiation. Each of its optical sources is moreover associated with phase modulation means intended to phase shift the optical radiations with respect to each other so as to vary the propagation angle of the combined radiation coming from all the optical sources. According to an advantageous configuration, the optical sources may come from the same main source.

This operating principle can be extrapolated to a 2D matrix of optical sources allowing scanning of an optical beam in two different directions, for example perpendicular to each other.

However, these devices are also not satisfactory.

This is because, the space actually swept by the light beam remains relatively limited.

Consequently, one aim of the present invention is to propose a light scanning device that makes it possible to scan a larger space than the known devices of the prior art.

Another aim of the present invention is to propose a light scanning device that has appreciable compactness.

Another aim of the present invention is to propose a light scanning device that is simpler to manufacture.

DESCRIPTION OF THE INVENTION

The aims of the invention are at least partly achieved by an optical scanner that comprises:

a support having a first plane face;

at least one optical source able to emit a main optical beam with a wavelength $\lambda$;

a plurality of elementary scanners that each comprise:

a beam that comprises a movable part and a fixed part, said fixed part resting on the first face;

a plurality of waveguides disposed on or in the movable part and intended to divide the main optical beam into a plurality of secondary optical beams;

a phase-control optical array that comprises a plurality of optical phase shifters each coupled to a waveguide, disposed on or in an emission section of the movable part and which extends from a free end of the beam opposite to a fixed end.

The movable part of at least one of the beams has, at rest, a deflection different from the deflection at rest of the movable parts of the other beams.

According to one embodiment, the movable parts of each of the beams all have, at rest, a different deflection.

According to one embodiment, each beam comprises, from a first face towards a second face parallel to the first face, a first layer, a second layer and a third layer, the deflection of the movable part of each of the beams being imposed by a level of internal stresses of one or other or both of the first layer and the third layer, advantageously the stress level of one or other or both of the first layer and third layer is a function of the thickness of the layer concerned.

According to one embodiment, the first layer and the third layer each comprise a dielectric material, advantageously the dielectric material comprises silicon dioxide.

According to one embodiment, each optical phase shifter comprises a diffraction grating coupled to phase-shifting means intended to impose a phase shift on the secondary optical beam coming from the waveguide to which the optical phase shifter in question is optically coupled.

According to one embodiment, the waveguides and/or the diffraction gratings comprise silicon nitride.

According to one embodiment, for each of the beams, the optical phase shifters are arranged in lines parallel or perpendicular to an elongation axis XX' defined by the fixed end and the free end.

According to one embodiment, the optical phase shifters are arranged in a matrix.

According to one embodiment, each elementary scanner is also provided with an actuator arranged to impose a bending on the movable part of the beam in question.

According to one embodiment, the actuator comprises at least one of the means selected from: electrostatic means, magnetic means, piezoelectric means, thermal means.

The invention is however not limited solely to these means.

According to one embodiment, the support has a parallelepipedal or cylindrical or other form. The invention is not limited solely to these forms. In particular, the support may take other forms, regular or not, for example pyramidal.

BRIEF DESCRIPTION OF THE DRAWINGS

Other features and advantages will emerge in the following description of an optical scanner according to the invention, given by way of non-limitative examples, with reference to the accompanying drawings, wherein.

DETAILED DESCRIPTION OF PARTICULAR EMBODIMENTS

The present invention relates to a scanner provided with a plurality of elementary scanners each able to scan a different surface by means of a light beam.

In this regard, each elementary scanner comprises a beam, for example a vibrating beam, on or in which is formed a phase-control array intended to extract, at a face of the beam, a light beam able to be emitted by a light source. According to the present invention, at least one beam of one of the elementary scanners, referred to as the first scanner, has, at rest, a deflection different from that of the beams of the other elementary scanners. This arrangement enables the first scanner to scan a surface, referred to as the first surface, different from the one scanned by the other elementary scanners.

In other words, the optical scanner according to the present invention makes it possible to cover a relatively large surface while keeping appreciable compactness.

Figure 3A:
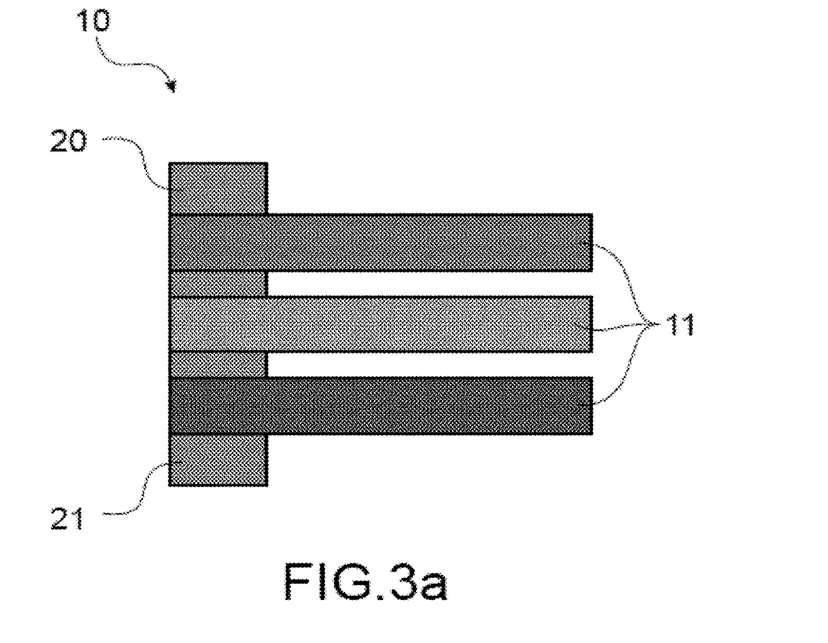
FIGS. 3a and 3b are schematic representations of an example embodiment of a scanner according to the present invention, respectively in plan view and in profile view.
Figure 3B:
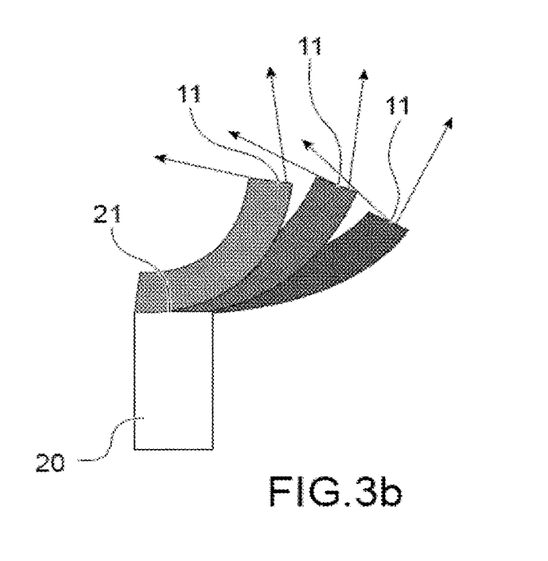

Thus FIGS. 3a and 3b are schematic representations of an example embodiment of a scanner 10 according to the present invention.

The scanner 10 comprises in particular a fixed support 20 provided with a main face 21. The support 20 can in particular be obtained from a semiconductor substrate, for example silicon.

The invention is however not limited solely to this embodiment, and said support 20 may comprise any other material able to fulfill the function of support.

Figure 10A:
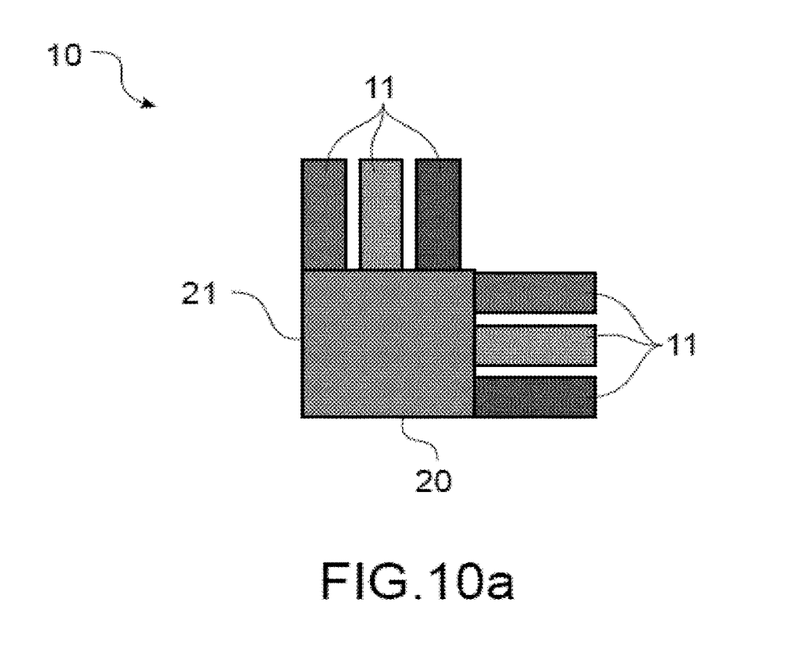
FIGS. 10a, 10b are schematic representations of another example embodiment of a scanner according to the present invention in plan view, FIG. 10a and FIG. 10b each show in particular an optical scanner provided with a support with respectively a parallelepipedal and cylindrical shape.
Figure 10B:
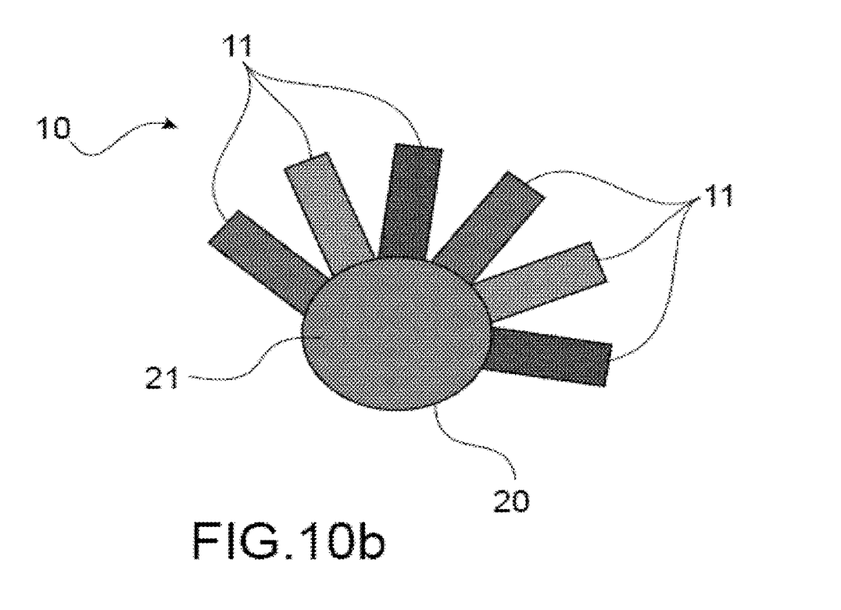

The support 20 may be parallelepipedal or cylindrical in shape, without however limiting the invention solely to these shapes (FIGS. 10a and 10b).

Figure 4:
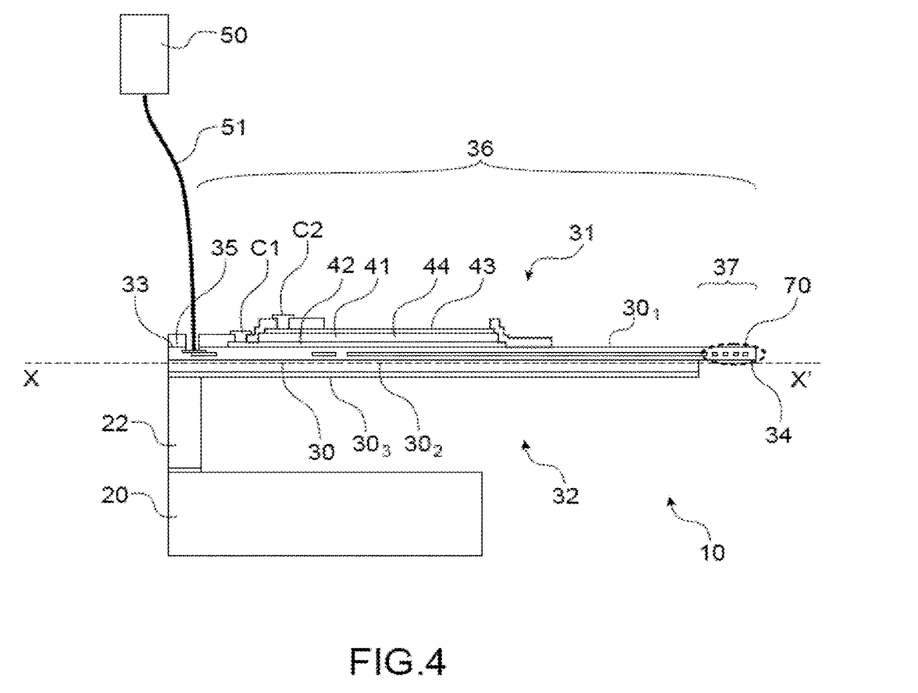
FIG. 4 is a schematic representation of an elementary scanner along a cutting plane perpendicular to the first face and comprising the elongation axis XX' according to the present invention.

The scanner 10 also comprises at least one optical source, for example a single source 50, able to emit a main optical beam with a wavelength λ (FIG. 4).

The main optical beam is advantageously quasi-monochromatic, or even monochromatic. The optical source 50 may for example comprise a laser source.

The wavelength λ may be between 400 nm and 2500 nm, for example equal to 905 nm, or equal to 1330 nm or again equal to 1550 nm.

The scanner 10 also comprises a plurality of elementary scanners 11, for example three in number in FIGS. 3a and 3b.

As shown in FIG. 4, an elementary scanner 11 comprises a beam 30 provided with a first face 31 and a second face 32, and which extends, along an elongation axis XX', from a fixed end 33 to a free end 34.

"Beam" means a solid mechanical element with a generally elongate form. By way of example, a beam according to the terms of the present invention may be parallelepipedal in shape.

The elongation axis XX', within the meaning of the present invention, is not necessarily linear and may consequently have a curvature (and therefore a deflection). This aspect is described in more detail later in the present description.

The beam 30 moreover comprises a movable part 36 that extends from the free end 34 towards the fixed end 33. The beam 30 may also comprise a fixed part 35, in line with the movable part and in the direction of the fixed end 33. The beam 30 is in particular secured to the support 20 by its fixed part 35 thereof. In particular, the fixed part 35 rests on the main face 21.

"Movable part" means a part of the beam able to undergo deformation by bending and/or twisting. For example, the movable part can undergo bending in a direction perpendicular to the first face and/or twisting about an elongation axis XX' defined by the fixed end and the free end.

The beam 30 may have a thickness of between 1 μm and several hundreds of μm, a length of between 100 μm and several millimeters, and a width of between 10 μm and several millimeters.

The thickness of the beam is defined as the distance separating the first face and the second face. The length of the beam is its dimension measured in the direction defined by the elongation axis XX' while its width is its dimension measured in a direction perpendicular to the direction defined by the elongation axis XX' and the thickness of said beam.

Figure 5:
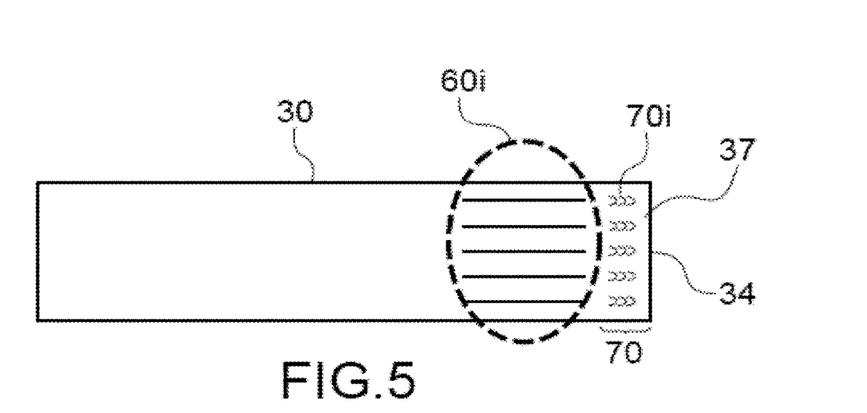
FIG. 5 is a partial representation of an optical scanner according to a view vertically in line with the first face and illustrating an arrangement of the waveguides able to be used in the context of the present invention.

Each elementary scanner 11 also comprises a plurality of waveguides 60i disposed on or in the beam 30 and intended to divide the main optical beam into a plurality of secondary optical beams. FIG. 5 illustrates in this regard a possible arrangement of the waveguides 60i in a view vertically in line with the first face 31. These waveguides are, according to this example, disposed parallel to the elongation axis XX', and so that the ratio between the spacing thereof (in μm) and the wavelength λ (in nm) is between 0.5 and 10.

The waveguides may for example have a wavelength between around one hundred microns and around ten millimeters, and be spaced apart from each other by a distance between around one hundred microns and around ten millimeters.

The example illustrated in FIG. 5 is not intended to limit the present invention to solely this arrangement, and it will be clear in the remainder of the description that other arrangements and/or geometries can be considered.

The main optical beam emitted by the optical source 50 is advantageously transmitted at the beams 30 by optical coupling means 51, for example by one or more optical fibers (FIG. 4).

Each elementary scanner 11 also comprises phase-control optical array 70 that comprises a plurality of optical phase shifters.

The phase-control array 70 can be controlled by control means.

The phase-control optical array 70 comprises a plurality of optical phase shifters 71i each coupled to a waveguide 60i.

The optical phase shifters 71i are moreover disposed on or in an emission section 37 of the movable part 36 that extends from the free end 34.

According to the present invention, each optical shifter 70i can comprise a diffraction grating 71i coupled to phase-shifting means 72i.

In particular, each phase-shifting means 72i is intended to impose a phase shift on the secondary optical beam coming from the waveguide 60i to which the optical phase shifter 70i in question is optically coupled.

Figure 6:
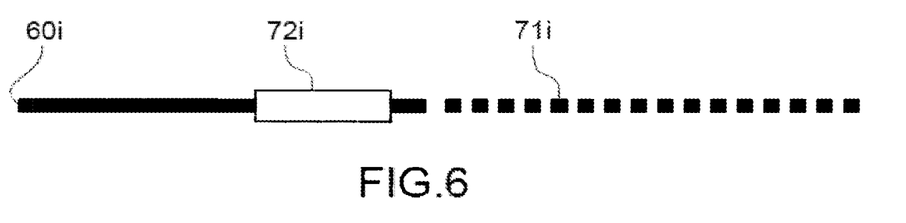
FIG. 6 is an illustration of an optical phase shifter according to a first architecture able to be used in the context of the present invention.

FIG. 6 is an illustration of an optical phase shifter 70i according to a first architecture able to be used in the context of the present invention. In particular, the diffraction grating 71i is formed by pins aligned in line with the waveguide 60i, while the phase-shifting means 72i can comprise a heating element disposed vertically in line with the waveguide 60i and intended to heat the latter locally in order to modulate the refractive index thereof.

Figure 7:
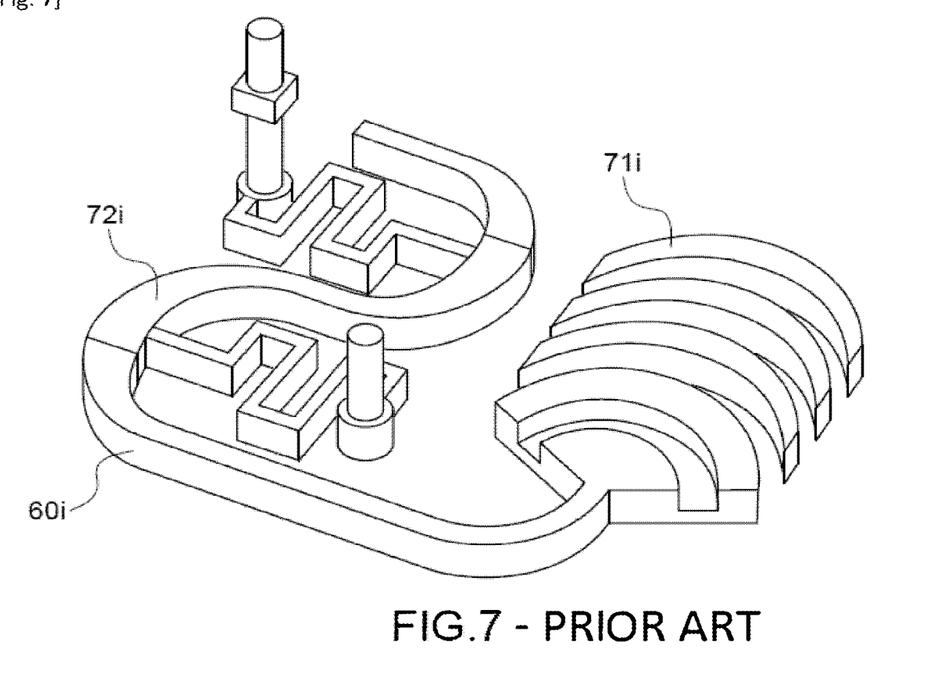
FIG. 7 is an illustration of an optical phase shifter (coming from document [4] cited at the end of the description) according to a second architecture able to be used in the context of the present invention.

FIG. 7 is an illustration of an optical phase shifter 70i according to a second architecture able to be used in the context of the present invention. In particular, the diffraction grating 71i is formed by aligned solid arcs, while the phase-shifting means 72i can comprise a heating element intended to heat the waveguide 60i locally in order to modulate the refractive index thereof.

Advantageously, the waveguides and/or the diffraction gratings may comprise silicon nitride.

According to a first variant, the optical phase shifters can be arranged in line perpendicular to an elongation axis XX' defined by the fixed end and the free end (FIG. 5).

In operation, such an elementary scanner 11, the main optical beam emitted by the optical source is initially divided into a plurality of secondary optical beams guided by the plurality of waveguides 60i. Each secondary optical beam guided by a given waveguide is next extracted from the beam by means of the diffraction grating 71i with which the waveguide in question is associated. All the secondary optical beams thus extracted from the same beam recombine to form a beam known as an elementary beam. A phase shift between the optical beams from the same beam caused by the phase-shifting means 72i makes it possible to vary the propagation angle of the elementary beam. This propagation angle varies in particular in a plane normal to the first face and which comprises the direction of alignment of the optical phase shifters.

Figure 8:
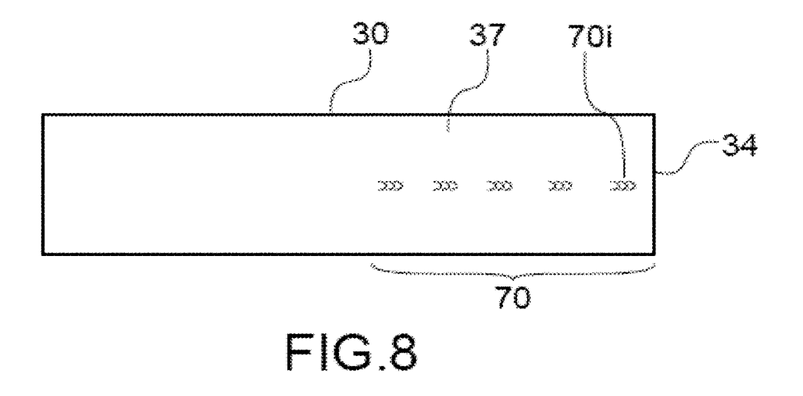
FIG. 8 is a partial representation of an optical scanner in a view vertically in line with the first face and illustrating an arrangement of the diffraction gratings according to second variant of the present invention.

According to a second variant illustrated in FIG. 8, the optical phase shifters 70i can be arranged in lines parallel to the elongation axis XX'.

Figure 9:
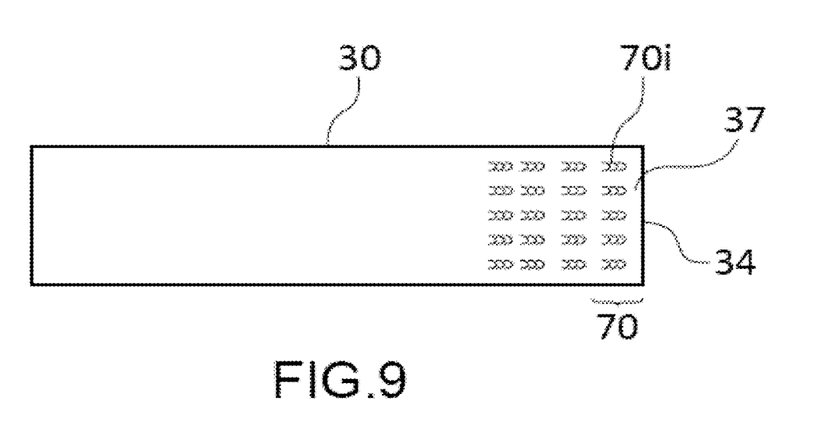
FIG. 9 is a partial representation of an optical scanner in a view vertically in line with the first face and illustrating an arrangement of the diffraction gratings according to third variant of the present invention.

According to a third variant illustrated in FIG. 9, the optical phase shifters 70i can be arranged in a matrix.

"Arranged in a matrix" means arranged in N rows and M columns. According to this third variant, an elementary scanner can thus scan the space at two propagation angles.

Particularly advantageously, the movable part of at least one of the beams, has, at rest, a deflection different from the deflection at rest of the movable parts of the other beams.

"Deflection" means a deformation or a sagging of the movable part of the beam with respect to a rectilinear elongation access. The deflection can be characterized by a deflection angle at rest.

A deflection at rest corresponds to an intrinsic deformation of the movable part. In other words this deformation of the movable part does not result from an external action or from the application of a particular force at said movable part.

More particularly, the deflection at rest of the movable part depends on the internal stresses of the materials constituting the beam. In this regard, the documents [2] and [3] cited at the end of the description relate to the effect of such stresses on the deflection at rest of the beam.

Thus a layer having a tensile stress (and conversely a compressive stress) disposed between the neutral axis of the beam and its second face will cause a bending of said beam in a direction normal to said second face (or conversely in a direction opposite to the direction normal to the second face).

In an equivalent manner, a layer having a tensile stress (and conversely a compressive stress) disposed between the neutral axis of the beam and its first face will cause a bending of said beam in a direction normal to said first face (or conversely in a direction opposite to the direction normal to the first face).

The properties (and in particular their internal stresses and/or their thicknesses) of the layers constituting the beam thus govern the bending at rest (as well as its amplitude) of the beam.

The difference in deflection between movable parts enables each elementary scanner to scan, with the elementary beam that is associated therewith, a different zone or surface. The surface thus covered by the optical scanner 10 according to the present invention is increased compared with the known optical scanners of the prior art.

Such a scanner is moreover still compact.

According to a particularly advantageous embodiment, the deflection at rest of the movable part can result from an internal stress caused by the actual structure of the beam.

In this regard, the beam 30 of an elementary scanner 11 may comprise, from its first face 31 towards its second face 32, a first layer, a second layer and a third layer. According to this configuration, the deflection of the movable part of each of the beams is imposed by a stress level of one or other or both of the first layer $30_1$ and of the third layer $30_3$. More particularly, the stress level of one or other or both of the first layer $30_1$ and of the third layer $30_3$ is a function of the thickness of the layer concerned.

The first layer $30_1$ and the third layer $30_3$ can advantageously comprise a dielectric material and more particularly silicon dioxide.

The second layer $30_2$ can comprise a semiconductor material, advantageously silicon, or more advantageously polycrystalline silicon.

In an equivalent manner, a reduction in the deflection at rest is observed as the thickness E1 increases.

Thus it is possible to impose the deflection of a beam simply by adjusting one or other or both of the first and second thicknesses.

In practice, a first layer made from $SiO_2$ exhibits a compressive stress of around 200 MPa and a Young's modulus of 70 GPa will cause a bending in a direction normal to the first face. This bending is greater, the higher the thickness of said layer.

In an equivalent manner, a third layer made from TEOS having a compressive stress of the order of 80 MPa and a Young's modulus of 70 GPa will cause a bending in a direction normal to the second face. This bending is greater, the higher the thickness of said layer.

The consideration according to the present invention of a beam having a deflection at rest different from one elementary scanner to another enables each of these to scan a different surface, referred to as an elementary surface. The elementary surfaces combined with each other then form the total surface able to be scanned by the optical scanner 10. This total surface may in particular be modulated according to the number of elementary scanners and the arrangement thereof with respect to the support 20.

In this regard, FIG. 10a shows a first possible arrangement of the elementary scanners on a parallelepipedal-shaped support 20. According to this first arrangement, a first plurality of elementary scanners 11 (three in number) extend from one side of the main face 21, while a second plurality of elementary scanners 11 (three in number) extend from another side of the main face.

FIG. 10b illustrates another possible arrangement. According to this arrangement, the support is cylindrical in shape, and the elementary scanners 11 extend in an essentially radial manner.

Particularly advantageously, each elementary scanner 11 is also provided with an actuator 40 arranged to impose bending on the movable part of the beam in question.

The actuator 40 can be controlled by control means, for example electronic control means, in particular equipped with a microprocessor or a computer. These control means may in particular be adapted to vibrate the beam in bending. These control means may in particular impose a vibration on the beam in bending or twisting. This vibration may in particular have a frequency equal to the resonant frequency of the beam so as to benefit from the mechanical quality factor. Operation at the resonant frequency also makes it possible to amplify the movement of the beam.

In this regard, the resonant frequency of a beam of length L, of width b, of thickness h and of density ρ and with a Young's modulus E follows the following relationship:

$$\left(\frac{E}{\rho}\right)^{1/2} \frac{h}{L^2}$$

Thus the resonant frequency increases with the thickness and decreases when its length increases. This reduction according to the thickness nevertheless follows a square law and is therefore more marked when it is a case of modifying the length.

In other words, the resonant frequency of the beam can be adjusted by its thickness and its length.

A "bending" of the beam corresponds here to a deformation of the latter on a plane perpendicular to the first face 31. This bending imposed by the actuator 40 is added to the bending of the beam at rest.

The actuator 40 may for example comprise means chosen from: electrostatic means, magnetic means, piezoelectric means or thermal means. The invention is however not limited solely to these means.

The actuator 40 may be disposed at least partly on the movable part 36. More particularly, the actuator 40 may partially cover the movable part 36 and the fixed part 35 at the first face.

The example shown in FIG. 4 uses a piezoelectric actuator 40. In particular, in this example, the actuator 40 comprises a layer of piezoelectric material 41 interposed between two electrodes 42 and 43 intended to impose a non-zero electrical voltage on either side of said layer of piezoelectric material 41. In this regard, the actuator 40 can be provided with contacts C1 and C2 at which a supply voltage of the electrodes can be applied. This supply voltage can in particular be applied with the control means. Under the action of this electrical voltage, the layer of piezoelectric material contracts along a plane perpendicular to the first face 31, and bends the movable part 36 of the beam 30.

In this regard, and as stated in the document [2] cited at the end of the description, the higher the electrical biasing field imposed on the layer of piezoelectric material (for example a layer of PZT), the greater the bending of the assembly formed by said layer and the beam. This bending is dependent not only on the mechanical and geometric properties of the beam but also on the electrical biasing field imposed on the layer of piezoelectric material.

The direction of deflection of the layer of piezoelectric material can depend on the sign of the electric voltage imposed by the electrodes, in particular when said layer comprises a non-ferroelectric piezoelectric material.

The amplitude of the deflection for its part can depend on numerous parameters, among which mention can be made of: the thickness of the beam, the amplitude of the voltage imposed by the electrodes and the thickness of the layer of piezoelectric material.

More particularly, the amplitude of deflection of a beam, for a given load, is directly proportional to the power of four of its length and inversely proportional to the product of its thickness and its moment of inertia.

In other words, the amplitude of deflection of a beam increases with its length and/or when its thickness decreases.

Thus, and having regard to the above, the amplitude of deflection depends on the mechanical and geometric parameters of the beam, but is also dependent on the biasing field imposed by the electrodes.

The beam may also have an initial bending that exerts an influence on the amplitude of bending thereof.

Advantageously, it is possible to vibrate the beam, and more particularly the resonant frequency thereof, in order to confer a better quality factor on the scanner.

The layer of piezoelectric material may comprise at least one of the materials chosen from: PZT (lead zirconate titanate) or AlN (aluminum nitride). Other piezoelectric materials can be envisaged.

Using an actuator at each of the beams makes it possible to also impose a scanning direction, for example other than or identical to that associated with the phase-control optical array.

According to another aspect of the present invention, the emission section 37 has a transparency adapted to allow an extraction of light from the first face and from the second face. In other words, the main optical beam can be extracted in the form of a first beam at the first face and of a second beam at the second face.

Moreover, still according to this aspect, the emission section 37 comprises solely the first layer $30_1$ (FIG. 4). Thus the second beam able to be extracted at the second face 32 is no longer screened/absorbed by the second layer $30_2$ and the third layer $30_3$. This arrangement makes it possible to use a second layer made from silicon and to consider a main optical beam with a wavelength λ equal to 905 nm.

Thus the optical scanner according to the present invention makes it possible to scan a surface with a greater extent than the scanners known from the prior art while conferring thereon appreciable compactness compared with the devices made from micromirrors.

Moreover, this optical scanner, which does not use micromirrors, does not require alignment and remains simple to use.

The scanner 10 according to the present invention can advantageously be used in a small image projector (for example a pico projector) in mobile electronic equipment and more particularly a mobile telephone or a connected watch, or an intra-retinal projection equipment (for augmented reality).

The scanner may also be used in the context of 3D application, and in particular 3D imaging.

The scanner 10 may also form the active part of a LIDAR, and for example be used in an autonomous vehicle.

REFERENCES

[1] Sven Holmstrom et al., "MEMS laser scanners: a review", Journal of Microelectromechanical Systems April 2014, DOI: 10.1109/JMEMS.2013.2295470;

[2]° Section 13.5.3 of the work "Integration of Ferroelectric and Piezoelectric Thin Films" by Defay;

[3]° Hsueh et al., "Thermal stress analyses of multilayered films on substrates and cantilever beams for micro sensors and actuators" J. Micromech. Microeng., 16, 2509-2515, 2006;

[4]° Jie Sun et al., "Large-scale nanophotonic phased array", Nature, 11727, vol 493, 195-199, January 2013.

The invention claimed is:

1. Optical scanner that comprises:
a support having a first plane face;
at least one optical source able to emit a main optical beam with a wavelength λ;
a plurality of elementary scanners that each comprise:
a beam that comprises a movable part and a fixed part, said fixed part resting on the first face;
a plurality of waveguides disposed on or in the movable part and intended to divide the main optical beam into a plurality of secondary optical beams;
a phase-control optical array that comprises a plurality of optical phase shifters each coupled to a waveguide, disposed on or in an emission section of the movable part and which extends from a free end of the beam opposite to a fixed end; the movable part of at least one of the beams has, at rest, a deflection different from the deflections at rest of the movable parts of the other beams.

2. Optical scanner according to claim 1, wherein the movable parts of each of the beams all have, at rest, a different deflection.

3. Optical scanner according to claim 1, wherein each beam comprises, from a first face towards a second face parallel to the first face, a first layer, a second layer and a third layer, the deflection of movable part of each of the beams being imposed by a stress level of one or other or both of the first layer and of the third layer, the stress level of one or other or both of the first layer and the third layer is a function of the thickness of the layer concerned.

4. Optical scanner according to claim 3, wherein the first layer and the third layer each comprise a dielectric material, the dielectric material comprises silicon dioxide.

5. Optical scanner according to claim 1, wherein each optical phase shifter comprises a diffraction grating coupled to phase-shifting means intended to impose a phase difference on the secondary optical beam coming from the waveguide to which the optical phase shifter in question is optically coupled.

6. Optical scanner according to claim 1, wherein the waveguides and/or the diffraction gratings comprise silicon nitride.

7. Optical scanner according to claim 1, wherein, for each of the beams, the optical phase shifters are arranged in lines parallel or perpendicular to an elongation axis XX' defined by the fixed end and the free end.

8. Optical scanner according to claim 1, wherein the optical phase shifters are arranged in a matrix.

9. Optical scanner according to claim 1, wherein each elementary scanner is also provided with an actuator arranged to impose bending or twisting on the movable part of the beam in question.

10. Optical scanner according to claim 9, wherein the actuator comprises at least one of the means chosen from: electrostatic means, magnetic means, piezoelectric means and thermal means.

11. Optical scanner according to claim 1, wherein the support is parallelepipedal or cylindrical shaped.

* * * * *